United States Patent [19]

Havoic-Conroy

[11] Patent Number: 4,590,671
[45] Date of Patent: May 27, 1986

[54] TOOL FOR REMOVING SPLIT PIN REMNANTS FROM A NUCLEAR REACTOR VESSEL

[75] Inventor: Stephanie M. Havoic-Conroy, N. Huntingdon, Pa.

[73] Assignee: Westinghouse Electric Corp., Pittsburgh, Pa.

[21] Appl. No.: 614,175

[22] Filed: May 29, 1984

[51] Int. Cl.$^4$ ............................................. B23P 19/00
[52] U.S. Cl. ....................................... 29/723; 29/235; 29/400 N; 29/426.1; 29/426.5; 29/720; 81/53.2; 81/488; 376/260; 376/262; 376/263; 376/264
[58] Field of Search ............. 29/235, 244, 270, 400 N, 29/426.1, 426.5, 720, 723; 376/260, 261, 262, 263, 264; 81/1 R, 3 R, 53.2, 57.38

[56] References Cited

U.S. PATENT DOCUMENTS

| | | | |
|---|---|---|---|
| 2,947,074 | 8/1960 | Newman | 29/426.5 X |
| 3,077,361 | 2/1963 | Tait et al. | 294/111 |
| 3,158,051 | 11/1964 | DeMart | 81/53.2 |
| 3,838,289 | 9/1974 | White | 376/260 X |
| 3,887,980 | 6/1975 | Yates et al. | 29/723 |
| 4,223,575 | 9/1980 | Krueger | 81/57.38 |
| 4,243,484 | 1/1981 | Tsuji et al. | 376/260 |
| 4,428,903 | 1/1984 | Kasik et al. | 376/261 |

Primary Examiner—Howard N. Goldberg
Assistant Examiner—Ronald S. Wallace
Attorney, Agent, or Firm—D. M. Satina

[57] ABSTRACT

A tool for removing split pin remnants which remain in anchor bores in the upper core plate of a nuclear reactor vessel after removal of guide tube assemblies therefrom, includes an elongated mast having parallel tubular members with handle apparatus at the upper end thereof and carrying at the lower end thereof a ram platform having an upstanding pin removal member. The ram platform is dimensioned to be lowered through any one of the guide tube seating apertures in the upper core plate. A locating plate mounted on the mast above the ram platform seats in the seating aperture and accurately positions the ram platform below the upper core plate with the pin driving member in registry with the pin bore. A hydraulic cylinder is mounted on the mast above the locating plate and has a piston rod extending through the locating plate and fixedly secured to the ram platform for moving it up and down to drive the pin from the bore. Hydraulic fluid is carried to and from the cylinder through the mast tubes. A TV camera and lamp may be mounted on the mast above the drive cylinder for remote accurate positioning of the apparatus.

20 Claims, 10 Drawing Figures

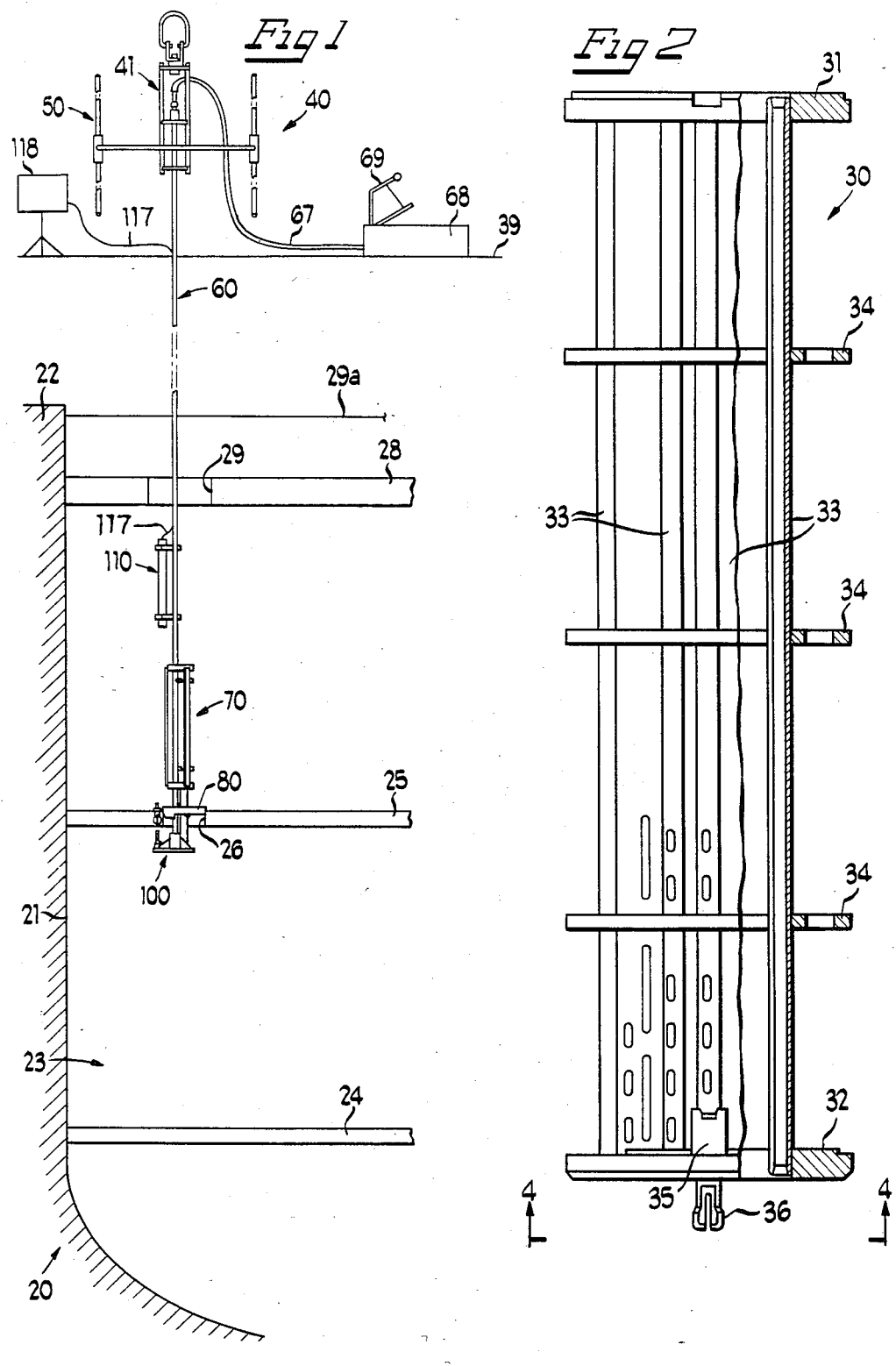

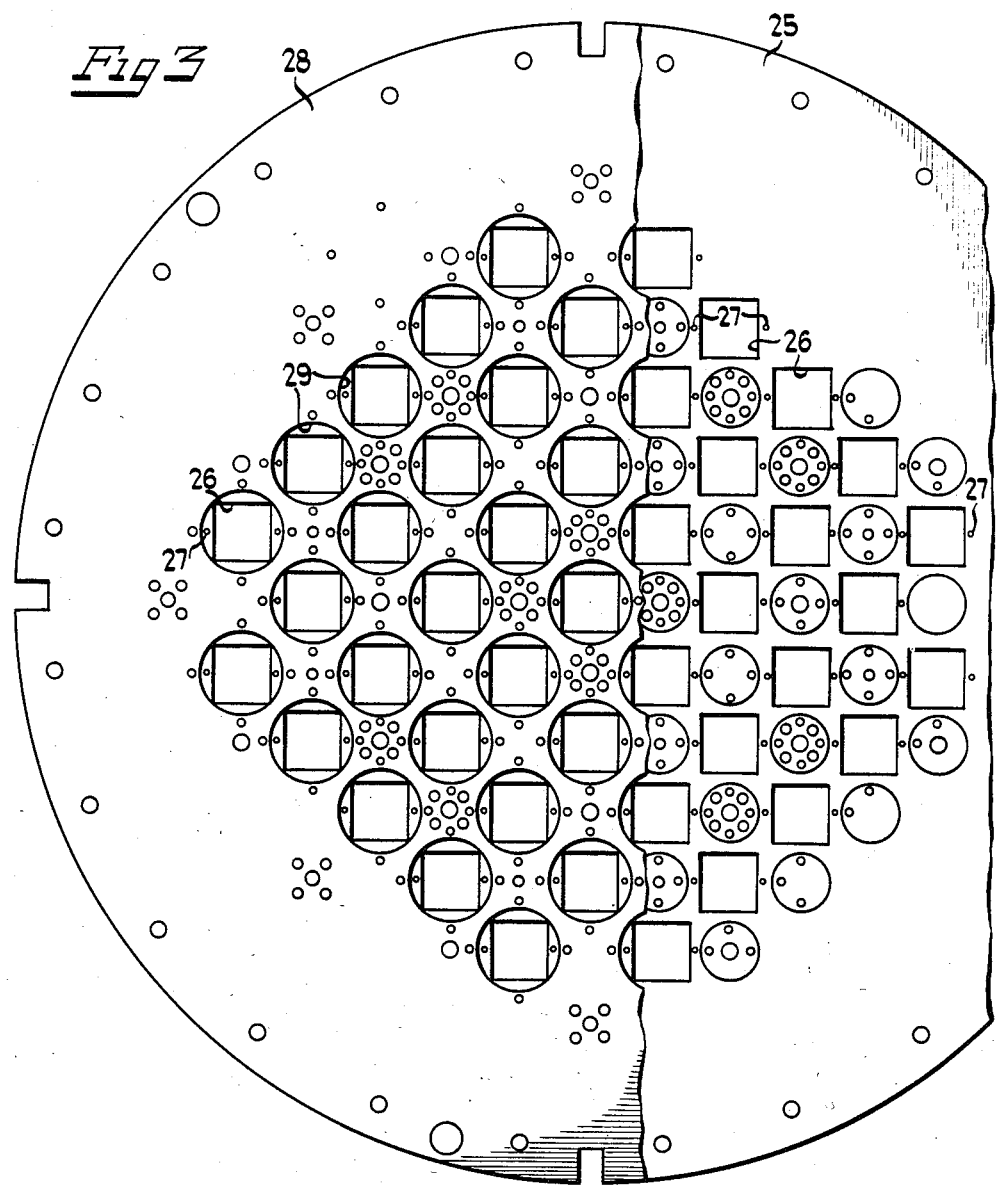

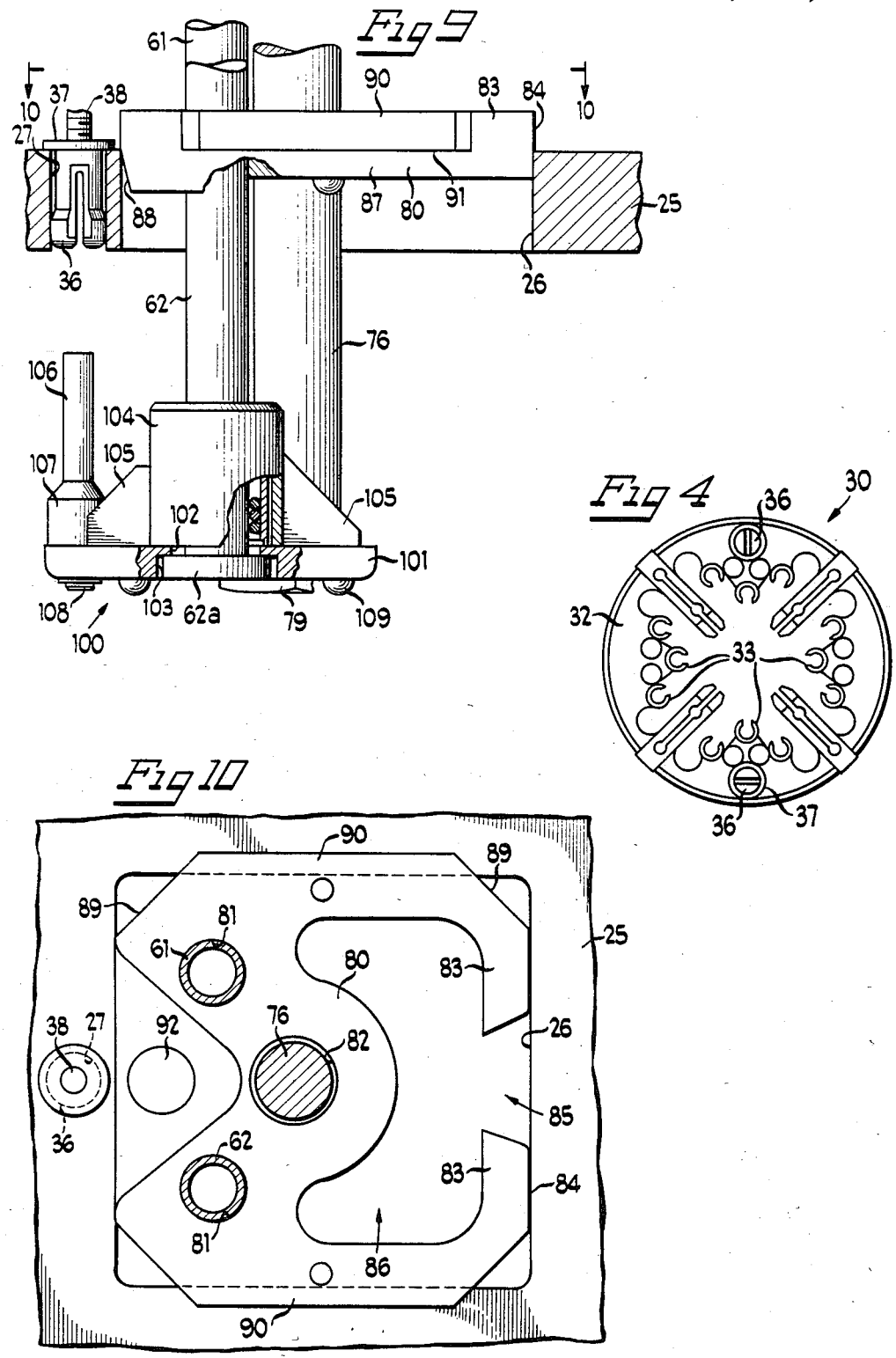

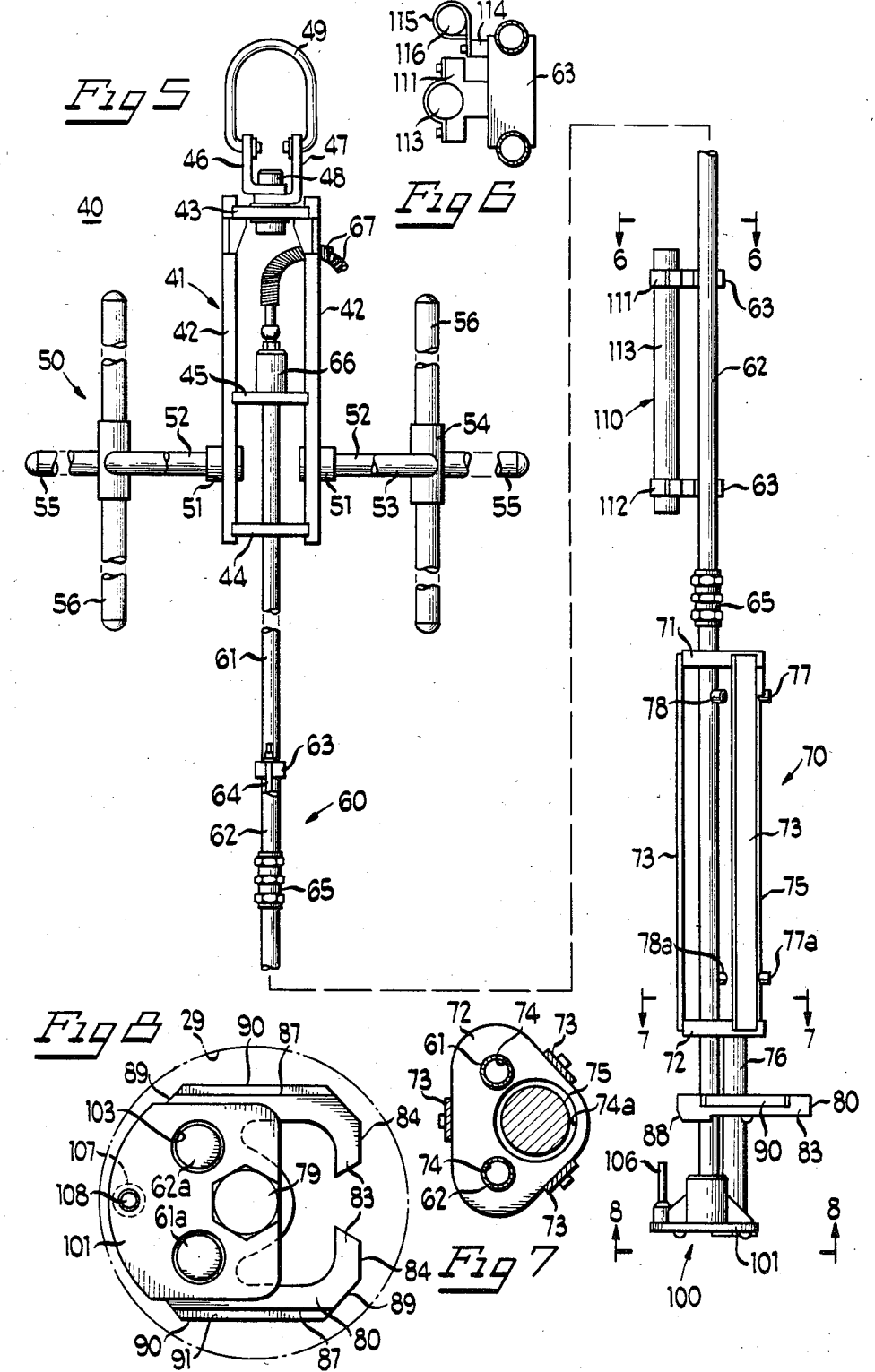

TOOL FOR REMOVING SPLIT PIN REMNANTS FROM A NUCLEAR REACTOR VESSEL

BACKGROUND OF THE INVENTION

The present invention relates to a tool for removing pins from bores in plates. The invention has particular application to the removal from the upper core plate of a nuclear reactor, remnants of split pins used to anchor guide tube assemblies.

A nuclear reactor typically includes a reactor vessel having a reactor core disposed between lower and upper core plates. The core includes a fuel rod assembly comprising a plurality of fuel rods which are lowered into place through corresponding apertures in the upper core plate. In order to guide the fuel rod insertion, guide tube assemblies are utilized, each being supported on an upper support plate disposed near the upper end of the vessel. Each guide tube assembly extends down to the upper core plate and has a bottom plate disposed for seating in the corresponding aperture in the upper core plate, this bottom plate carrying a pair of anchoring split pins which are respectively frictionally received in corresponding anchor bores on opposite sides of the seating aperture. The upper end of each guide tube assembly is received through a large hole in the upper support plate. The reactor also includes a plurality of support columns, thermocouples and the like which are also disposed between the upper core plate and the upper support plate and which, along with the guide tube assemblies, form what is known as the "upper internals" of the reactor.

In refueling of the nuclear reactor, it is necessary to remove the spent fuel rods from the core and replace them with new fuel rods. Before the spent fuel rods can be removed, the guide tube assemblies must first be removed. Commonly, the metal in the split pin tends to harden as a result of the alternating heat and cold of the reactor cycles, thus making the pins brittle and subject to breakage. Thus, when the guide tube assemblies are pulled, the force necessary to pull the split pins from their bores frequently results in their breakage, leaving pin remnants in the bores. These broken split pins are replaced on the guide tube assemblies, but before the guide tube assemblies can be reinstalled, the old split pin remnants must be removed from the upper core plate. This removal is complicated by the fact that the upper core plate is between 30 and 60 feet beneath the work platform or bridge from which the removal operation must be performed, and by the fact that the reactor vessel is filled with water. Furthermore, the upper support plate obscures the upper core plate, so that it can be viewed only through the holes in the upper support plate. Finally, the pin remnants cannot be simply punched down out of their bores, since they would then fall into and foul the reactor core.

SUMMARY OF THE INVENTION

It is a general object of this invention to provide means for effectively removing split pin remnants from the upper core plate of a nuclear reactor vessel.

An important object of the invention is the provision of means of the type set forth in the form of a tool which is of simple and economical construction.

Still another object of the invention is the provision of a tool of the type set forth which permits the pin remnant to be discharged from the anchor bore at the upper surface of the upper core plate.

Yet another object of the invention is the provision of a tool of the type set forth, which can be easily operated from the work platform of the nuclear reactor.

Another object of the invention is the provision of a tool of the type set forth, which can be lowered through the apertures in the upper support plate and the upper core plate.

These and other objects of the invention are attained by providing a tool for removing from anchor bores in the upper core plate of a nuclear reactor vessel, anchor pins which may be broken from guide tube assemblies upon withdrawal thereof from large seating apertures in the upper core plate adjacent to the anchor bores, the tool comprising: support means dimensioned to fit through a seating aperture, a pin driving member carried by the support means, means for lowering the support means through a seating aperture to a use position beneath the upper core plate with the pin driving member in registry with an adjacent anchor bore, and motive means for moving the pin driving member upwardly into the anchor bore to drive the anchor pin therefrom.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a fragmentary, partially diagrammatic, vertical sectional view of a nuclear reactor vessel, with a removal tool constructed in accordance with and embodying the features of the present invention illustrated in its operating configuration, and with the core assembly and the upper internals of the reactor removed, more clearly to show the operation of the tool;

FIG. 2 is an enlarged, side elevational view in partial vertical section of one of the guide tube assemblies removed from the reactor of FIG. 1;

FIG. 3 is an enlarged, top plan view of the upper support plate of the reactor of FIG. 1, partially broken away to show the upper core plate therebelow;

FIG. 4 is a bottom plan view of the guide tube assembly of FIG. 2, taken along the line 4—4 therein;

FIG. 5 is an enlarged side elevational view of the pin removal tool of the present invention, with portions removed and/or displaced to more easily fit on the sheet;

FIG. 6 is a view in horizontal section taken along the line 6—6 in FIG. 5;

FIG. 7 is a view in horizontal section taken along the line 7—7 in FIG. 5;

FIG. 8 is an enlarged, bottom plan view of the tool of FIG. 5, taken along the line 8—8 therein, and illustrating the dimensions relative to the openings in the upper support plate;

FIG. 9 is an enlarged, fragmentary, side elevational view of the lower end of the tool of FIG. 5, illustrated mounted in its use position on the upper core plate, and with portions broken away more clearly to show the structure; and FIG. 10 is a fragmentary view in horizontal section taken along the line 10—10 in FIG. 9.

DESCRIPTION OF THE PREFERRED EMBODIMENT

Referring to FIGS. 1 and 3 of the drawings, there is illustrated a nuclear reactor 20 including a reactor vessel 21 encased in a concrete shield 22. The vessel 21 includes a reactor core 23 disposed between a lower core plate 24 and an upper core plate 25, the core 23 including a fuel rod assembly (not shown) in a known manner. The upper core plate 25 has a plurality of rectangular seating apertures 26 therein, each having a pair of small cylindrical anchor bores 27 disposed respectively adjacent to opposite side edges thereof (see FIG. 3). A plurality of other openings are typically provided in the upper core plate 25 for support columns, thermocouples and the like (not shown), all in a known manner. Disposed near the upper end of the vessel 21 is an upper support plate 28 having a plurality of relatively large circular holes 29 therethrough, respectively coaxially aligned with the seating apertures 26 in the upper core plate 25. Preferably, each of the holes 29 has a diameter greater than the length of the corresponding seating aperture 26. A plurality of other openings are also provided in the upper support plate 28 for other structure, as explained above.

It will be appreciated that in normal use the vessel 21 is filled with water to a level 29a. The space between the upper core plate 25 and the upper support plate 28 is occupied by the "upper internals" (not shown) of the reactor vessel 21, including guide tube assemblies, support columns, thermocouples and the like. Referring to FIGS. 2 and 4, one of the guide tube assemblies 30 is illustrated and includes a top plate 31 and a bottom plate 32 interconnected by a plurality of tubes 33. A plurality of intermediate plates 34 are equidistantly spaced apart between the top and bottom plates 31 and 32 for providing further rigidity to the guide tube assembly 30 and holding the tubes 33 in place. Fixedly secured to the upper surface of the bottom plate 32 are diametrically spaced apart locking nuts 35, in which are respectively mounted two split pins 36. More specifically, each of the split pins 36 has an annular flange 37 at its upper end, from which projects upwardly an externally threaded coupling stud 38 adapted for threaded engagement in the corresponding one of the locking nuts 35.

Thus, it will be appreciated that, in use, the split pins 36 depend from the bottom plate 32 and are so disposed as to be receivable respectively in the anchor bores 27 at the opposite sides of one of the seating apertures 26 in the upper core plate 25, when the bottom plate 32 of the guide tube assembly 30 is disposed over that seating aperture 26. The diameter of each split pin 36 is slightly greater than the diameter of the anchor bores 27, the split pin 36 being resiliently compressible to provide a friction fit in the anchor bores 27. The top plate 31 is receivable through the corresponding opening 29 in the upper support plate 28 and is adapted to be secured thereto by suitable means. It will be appreciated that there is a guide tube assembly 30 for each of the seating apertures 26. Preferably, these guide tube assemblies 30 are all interconnected above the upper support plate 28 so that they can be removed simultaneously as a unit. The tubes 33 of each guide tube assembly 30 define a central passage for guiding the insertion of fuel rods into the core 23, all in a known manner.

The nuclear reactor 20 is provided with a work platform or bridge 39 disposed above the reactor vessel 21. Preferably, this work platform 39 is between 30 and 60 feet above the upper core plate 25. Workmen on the work platform 39 operate a removal tool 40, constructed in accordance with and embodying the features of the present invention. The removal tool 40 includes a frame 41 carrying a handle assembly 50 to which is mounted the upper end of a mast assembly 60. The mast assembly 60 carries a drive assembly 70 near its lower end, and has fixedly secured thereto a locating plate 80 immediately beneath the drive assembly 70. A ram assembly 100 is carried by the mast assembly at its lower end and is dimensioned to be receivable through the openings 29 in the upper support plate 28 and the seating apertures 26 in the upper core plate 25. To facilitate a maneuvering of the ram assembly 100, the removal tool 40 also includes a remote TV assembly 110 carried by the mast assembly 60 just above the drive assembly 70. Thus, in use, workmen on the work platform 39 manually grasp the removal tool 40 by the handle assembly 50, and lower the ram assembly 100 down through one of the holes 29 in the upper support plate 28 and through the corresponding seating aperture 26 in the upper core plate 25, as will be explained more fully below.

Referring now also to FIGS. 5-10, the removal tool 40 has a frame 41 which includes a pair of parallel, spaced-apart bars 42, interconnected at their upper and lower ends by upper and lower plates 43 and 44 and intermediate these ends by an intermediate plate 45. Pivotally mounted on the upper plate 43 are clevis members 46 and 47 which rotate on a swivel bolt 48, the upper ends of these clevis members 46 and 47 being interconnected by a handle bail 49.

The handle assembly 50 includes two coupling blocks 51 respectively secured to the bars 42 adjacent to their lower ends, and on which are mounted two radially extending support arms 52, coupled at their outer ends to a ring 53. Carried by the ring 53 are a pair of diametrically spaced-apart coupling joints 54, to which are respectively coupled two radially outwardly extending handles 55. Also secured to each of the coupling joints 54 are aligned upwardly and downwardly extending vertical handles 56. The total vertical extent of the handles 56 is preferably approximately 5 feet.

The mast assembly 60 includes two elongated parallel tubes 61 and 62, each preferably comprising a plurality of tube sections interconnected by couplings 65. Respectively integral with the tubes 61 and 62 at their lower ends are coupling disks 61a and 62a (see FIGS. 8 and 9). The upper ends of the tubes 61 and 62 are secured to the plates 44 and 45 of the frame 41, and the tubes 61 and 62 are interconnected at vertically spaced-apart points therealong by a plurality of support brackets 63.

Further adding rigidity to the mast assembly 60 is an elongated connecting rod 64 which extends between the tubes 61 and 62 parallel thereto and is secured to each of the support brackets 63 by suitable means (see FIG. 5). Coupled to the tubes 61 and 62 at their upper ends is a hydraulic fitting 66 which is mounted on the frame plate 45. Secured to the fitting 66 and communicating therewith are two hoses 67 which extend to a portable control assembly 68 disposed on the work platform 39. Preferably, the control assembly 68 includes suitable valves and a manually-operated hydraulic pump 69 for pumping hydraulic fluid respectively to the tubes 61 and 62, as will be explained more fully below.

The drive assembly 70 includes upper and lower generally triangular plates 71 and 72 fixedly secured to the mast assembly 60 near the lower end thereof and interconnected by a plurality of vertically extending metal bars or straps 73 to provide a rigid framework. Mounted in this framework is a vertically extending hydraulic cylinder 75 having a piston rod 76 projecting from the lower end thereof for vertical reciprocating movement. The upper and lower plates 71 and 72 have bores 74 therethrough for snugly accommodating the tubes 61 and 62 and the lower plate 72 has an opening 74a therethrough (FIG. 7) for freely accommodating the piston rod 76. The hydraulic cylinder 75 is of the double-acting type, being provided with ports 77 and 77a, respectively adjacent to the upper and lower ends thereof, these ports being connected by suitable conduits (not shown) to ports 78 and 78a which are respectively provided on the tubes 61 and 62 (see FIG. 5). Preferably, the lower end of the piston rod 76 has an internally threaded axial bore (not shown) for receiving a coupling stud or bolt 79, as will be explained more fully below.

The locating plate 80 is fixedly secured to the mast assembly 60 a slight distance beneath the lower plate 72 of the drive assembly 70. The locating plate 80 has two bores 81 therethrough for respectively receiving the tubes 61 and 62, which may be fixedly secured to the locating plate 80, as by welding. Also formed through the locating plate 80 is a bore 82 dimensioned for freely receiving the piston rod 76 therethrough to accommodate reciprocating movement thereof. The locating plate 80 is generally rectangular in outline, having outer dimensions substantially the same as those of the seating apertures 26 in the upper core plate 25 but with the corners mitered, as at 89. But along one side if the locating plate 80 there are formed two opposed arms 83 defining a gap 85 therebetween communicating with an irregularly shaped recess or aperture 86 formed through the locating plate 80 (see FIGS. 8 and 10).

The locating plate 80 is dimensioned to seat snugly in one of the seating apertures 26, the arms 83 being provided with bearing surfaces 84, and the adjacent sides of the locating plate 80 having side bearing surfaces 87 (see FIG. 8) for bearing engagement with the corresponding side walls of the seating aperture 26. The side of the locating plate 80 opposite the arms 83 has a beveled guide surface 88 along its lower edge to facilitate seating entry into the seating aperture 26. Preferably, the seating apertures 26 and the locating plate 80 are so dimensioned that the locating plate will only fit in the seating aperture 26 in the orientation illustrated in FIG. 10, or rotated 180° therefrom.

Integral with the side edges of the locating plate 80 adjacent to the arms 83 and projecting laterally outwardly from the upper edges thereof are two flanges 90, each being provided with a lower bearing surface 91 adapted to rest upon the upper surface of the upper core plate 25 when the locating plate 80 is seated in the seating aperture 26, to support the locating plate 80 and limit the depth of insertion thereof.

Formed on the upper surface of the locating plate 80 is a recess or pocket 92 adjacent to the side thereof opposite the arms 83 for receiving discharged split pin remnants, as will be explained more fully below. As can best be seen in FIGS. 8 and 10, the locating plate 80 is arranged with the tubes 61 and 62 extending therethrough closely adjacent to the side thereof opposite the arms 83, so that the arms 83 project laterally well out from one side of the mast assembly 60.

The ram assembly 100 includes a flat support platform 101 which is generally rectangular in shape but is provided with an arcuate surface along one side edge with a radius slightly less than the radius of the holes 29 in the the upper support plate 28 (see FIG. 8). The support platform 101 has a pair of bores 102 therethrough (see FIG. 9) for respectively receiving the tubes 61 and 62. Each of the bores 102 has an enlarged-diameter portion 103 at the bottom surface of the support platform 101 for accommodating the coupling disks 61a and 62a (FIGS. 8 and 9). The piston rod 76 engages the upper surface of the support platform 101 over a bore (not shown) for receiving the coupling bolt 79, fixedly to secure the support platform 101 to the lower end of the piston rod 76. Mounted on the upper surface of the support platform 101, respectively in surrounding relationship with the bores 102, are two cylindrical bearing bushings 104, each secured in place by gusset plates 105.

Fixedly secured to the support platform 101 adjacent to the center of the arcuate side edge thereof is an upstanding cylindrical drive stud 106 having an enlarged-diameter base 107 which may be secured in place by a suitable coupling fastener 108. The drive stud 106 is dimensioned to fit freely through the anchor bores 27 and to engage both legs of the split pins 36. The support platform 101 may also be provided with suitable bumper pins 109. It will be appreciated that, in operation, the support platform 101 moves up and down with the piston rod 76, the bearing bushings 104 accommodating free sliding movement along the tubes 61 and 62.

The video camera assembly 110 is mounted on the mast assembly 60 just above the drive assembly 70. More specifically, the video camera assembly 110 includes upper and lower brackets 111 and 112, respectively fixedly secured to two of the support brackets 63 for securely holding a video camera 113 in place, with its axis oriented substantially parallel to the tubes 61 and 62 and pointed downwardly. Carried by the lower bracket 112 is a mounting stud 114 on which is secured a clamp 115 for supporting a lamp 116 (see FIG. 6) to illuminate the field of view. The video camera 113 and the lamp 116 may be connected by a cable 117, which extends up along the mast assembly 60, to a video monitor 118 which is mounted on the work platform 39 (FIG. 1).

In operation, when the guide tube assemblies 30 and the spent fuel rods have been removed from the reactor vessel 21, the remnants of split pins 36 which have been broken off and left in the anchor bores 27 of the upper support plate 25 are removed by the use of the removal tool 40. Workmen on the work platform 39, having first fully extended the piston rod 76 by the use of the control assembly 68 and pump 69, lower the removal tool 40 into the reactor vessel 20 through one of the holes 29 in the upper support plate 28. In this regard, it will be appreciated that the mast assembly 60, the drive assembly 70, the locating plate 80, the ram assembly 100 and the video camera assembly 110 are all dimensioned and arranged so as to fit freely through the hole 29. However, since portions of the tool 40 are laterally displaced from one another, some slight lateral movement of the mast assembly 60 may be necessary after one portion has cleared the upper support plate 28 to align the next portion with the hole 29.

Once the video camera assembly 110 passes below the upper support plate 28, it is utilized to remotely view the upper core plate 25 so as accurately to align the removal tool 40 with the seating aperture 26 corresponding to the hole 29 through which the mast assembly 60 is extending. With the aid of the video camera assembly 110 the removal tool 40 is maneuvered by the use of the handle assembly 50, so as to lower the ram assembly 100 through the seating aperture 26. In this regard, it will be noted that the ram assembly 100 and the locating plate 80 are laterally offset with respect to each other. Thus, once the ram assembly 100 has cleared the upper core plate 25, the mast assembly 60 must be shifted sideways to bring the locating plate 80 into alignment with the seating aperture 26. The locating plate 80 is then lowered into seating engagement in the seating aperture 26 until the flanges 90 engage the upper surface of the upper core plate 25, as can best be seen in FIG. 10.

When the locating plate 80 has thus been seated, the ram assembly 100 will accurately be held in a use position, with the drive stud 106 disposed immediately below in coaxial registry with one of the anchor bores 27. In the event that there are remnants of split pins 36 in the anchor bores 27 on both sides of the seating aperture 26, the gap 85 and recess 86 in the locating plate 80 provide clearance for portions of the remnants projecting above the upper core plate 25, during lowering of the ram assembly 100 through the seating aperture 26 and subsequent seating of the locating plate 80 therein.

When the ram assembly 100 has thus been disposed in its use position, the operator manually actuates the pump 69 to pump hydraulic fluid to the lower end of the hydraulic cylinder 75 to retract or raise the piston rod 76 and the support platform 101 attached thereto. The length of the piston rod 76 and the drive stud 106 are such, that the drive stud 106 will project into and completely through the anchor bore 27 before the bearing bushings 104 engage the locating plate 80, thereby to drive the remnant of the split pin 36 completely from the anchor bore 27. Preferably, the hydraulic system is designed to exert between 2,000 and 6,000 lbs. of force on the remnant of the split pin 36 lodged in the anchor bore 27, which is sufficient to completely dislodge any such remnant. The pocket 92 in the locating plate 80 serves to catch any remnants which fall toward the locating plate 80, facilitating removal thereof. Otherwise, the dislodged remnants are withdrawn by a separate mechanical gripping tool after the removal tool 40 has been removed from the reactor vessel 21. After remnants have been removed from the anchor bore 27, the pump 69 and the control assembly 68 are again actuated to apply pressurized hydraulic fluid to the upper end of the cylinder 75 to again lower the piston rod 76 and the ram assembly 100.

If there is another split pin remnant in the anchor bore 27 on the opposite side of the seating aperture 26, the removal tool 40 is lifted just enough to dislodge the locating plate 80 from the seating aperture 26, and the tool 40 is then rotated 180°. The locating plate 80 is then again seated in the seating aperture 26 to bring the drive stud 106 into its use position beneath the other anchor bore 27 and the removal operation is repeated. Afterward, the removal tool 40 is completely withdrawn from the reactor vessel 21 through the seating aperture 26 and the hole 29 and is then moved to the next hole 29 to repeat the procedure until all pin remnants have been removed from the upper core plate 25.

In a constructional model of the present invention, all materials are designed to be compatible for use in borated reactor grade water, and all tool components which may contact the upper internals of the reactor are made of materials, such as 300 series stainless steel, which will not be deleterious to those upper internals components. The parts are arranged so that when the removal tool 40 is seated in its use position in the seating aperture 26, the maximum clearance below the upper core plate 25 is 10 inches. In typical reactor installations with which the removal tool 40 is designed to be used, the holes 29 in the upper support plate 28 have a diameter of about 9 inches and the seating apertures 26 in the upper core plate 25 are approximately 6.6 inch squares.

From the foregoing, it can be seen that there has been provided an improved removal tool for removing split pin remnants from the upper core plate of a nuclear reactor, the tool being of simple and economical construction, while affording accurate remote manual operation to remove remnants while preventing them from falling into the reactor core.

I claim:

1. A tool for removing from anchor bores in the upper core plate of a nuclear reactor vessel, anchor pin remnants which may be broken from guide tube assemblies upon withdrawal thereof from large seating apertures adjacent to the anchor bores in the upper core plate, said tool comprising: support means dimensioned to fit through a seating aperture, a pin driving member carried by said support means, means for lowering said support means through a seating aperture to a use position beneath the upper core plate with the pin driving member in registry with an adjacent anchor bore, and motive means for moving said pin driving member upwardly into the anchor bore to drive the anchor pin remnant therefrom.

2. The tool of claim 1, wherein said motive means comprises fluid-operated drive means.

3. The tool of claim 2, wherein said motive means includes a hydraulic cylinder.

4. The tool of claim 1, wherein said lowering means is manually operated.

5. The tool of claim 1, wherein the reactor vessel includes an upper support plate overlying the upper core plate and having a plurality of holes therethrough respectively coaxial with but substantially larger than the seating apertures, said tool further including video camera means disposed a predetermined distance above said support means for permitting observation of the movement and position of said support means after it has passed beneath the upper support plate.

6. The tool of claim 5, wherein said video camera means further includes lamp means for illuminating the viewing area.

7. The tool of claim 1, wherein said motive means is coupled to said support means for effecting movement thereof.

8. A tool for removing from anchor bores in the upper core plate of a nuclear reactor vessel, anchor pin remnants which may be broken from guide tube assemblies upon withdrawal thereof from large seating apertures adjacent to the anchor bores in the upper core plate, said tool comprising: elongated mast means capable of extending from the top of the reactor vessel to beneath the upper core plate, support means carried by said mast means at one end thereof and dimensioned to fit through a seating aperture, a pin driving member carried by said support means, locating means carried by said mast means and spaced a predetermined distance from said support means and adapted for cooperation with the seating aperture after said support means has been lowered therethrough to accurately position said support means in a use position beneath the upper core plate with the pin driving member in registry with an adjacent anchor bore, and motive means carried by said mast means and coupled to said pin driving member for moving said pin driving member upwardly into the anchor bore to drive the anchor pin remnant therefrom.

9. The tool of claim 8, wherein said locating means comprises a locating plate fixedly secured to said mast means.

10. The tool of claim 8, wherein said locating means comprises a locating plate having peripheral surfaces dimensioned and arranged for close-fitting seating engagement in the associated seating aperture.

11. The tool of claim 10, wherein said locating plate includes a pair of flanges extending laterally from opposite sides thereof and adapted to engage the upper surface of the upper core plate when said locating plate is seated in the seating aperture for limiting the depth of insertion therein.

12. The tool of claim 8, wherein said locating means and said support means respectively extend laterally in opposite directions from said mast means to facilitate alignment of the pin driving member with the anchor bore when said support means is disposed in its use position.

13. The tool of claim 8, wherein said locating means includes pocket means disposed adjacent to the anchor bore when said locating means is seated in said seating aperture for receiving the anchor pin remnant when it is driven from the anchor bore.

14. The tool of claim 8, wherein the upper core plate has two anchor bores respectively disposed along opposite side edges of each of the seating apertures, said locating means including recess means to provide clearance for an anchor pin remnant opposite the one to be removed during seating of the locating means.

15. A tool for removing from anchor bores in the upper core plate of a nuclear reactor vessel, anchor pin remnants which may be broken from guide tube assemblies upon withdrawal thereof from large seating apertures adjacent to the anchor bores in the upper core plate, said tool comprising: elongated mast means including two parallel tubular members capable of extending from the top of the reactor vessel to beneath the upper core plate, support means carried by said mast means at one end thereof and dimensioned to fit through a seating aperture, a pin driving member carried by said support means, locating means carried by said mast means and spaced a predetermined distance from said support means and adapted for cooperation with the seating aperture after said support means has been lowered therethrough to accurately position said support means in a use position beneath the upper core plate with the pin driving member in registry with an adjacent anchor bore, a fluid-operated double-acting cylinder carried by said mast means and having ports respectively communicating with said tubular members, and a source of pressurized fluid communicating with said tubular members at the upper ends thereof, said cylinder having a piston rod arranged for reciprocating movement parallel to said tubular members and coupled to said pin driving member for effecting reciprocating movement thereof upwardly into the anchor bore to drive the anchor pin therefrom and downwardly out of the anchor bore.

16. The tool of claim 15, wherein said cylinder is mounted above said locating means.

17. The tool of claim 16, wherein said locating means comprises a locating plate having an opening therethrough for accommodating passage of said piston rod therethrough.

18. The tool of claim 15, wherein said piston rod is fixedly secured to said support means for effecting reciprocating movement thereof, thereby to move said pin driving member.

19. The tool of claim 18, wherein said support means is vertically slidably movable along said mast means.

20. The tool of claim 15, wherein said cylinder comprises a hydraulic cylinder.

* * * * *